US006842876B2

(12) United States Patent
Schilit et al.

(10) Patent No.: US 6,842,876 B2
(45) Date of Patent: Jan. 11, 2005

(54) DOCUMENT CACHE REPLACEMENT POLICY FOR AUTOMATICALLY GENERATING GROUPS OF DOCUMENTS BASED ON SIMILARITY OF CONTENT

(75) Inventors: William Noah Schilit, Menlo Park, CA (US); Morgan N. Price, Palo Alto, CA (US); Gene Golovchinsky, Palo Alto, CA (US)

(73) Assignees: Fuji Xerox Co., Ltd., Tokyo (JP); Xerox Corporation, Stamford, CT (US)

( * ) Notice: Subject to any disclaimer, the term of this patent is extended or adjusted under 35 U.S.C. 154(b) by 0 days.

(21) Appl. No.: 09/059,335

(22) Filed: Apr. 14, 1998

(65) Prior Publication Data

US 2002/0052898 A1 May 2, 2002

(51) Int. Cl.[7] .................................................. G06F 3/14
(52) U.S. Cl. ........................ 715/530; 715/500; 715/531
(58) Field of Search ................................ 707/500, 532, 707/531, 4, 7, 530; 715/500, 532, 530, 531

(56) References Cited

U.S. PATENT DOCUMENTS

| | | | | |
|---|---|---|---|---|
| 5,524,190 A | * | 6/1996 | Schaeffer et al. | 707/522 |
| 5,619,709 A | * | 4/1997 | Caid et al. | 707/532 |
| 5,717,914 A | | 2/1998 | Husick et al. | 707/5 |
| 5,806,073 A | * | 9/1998 | Piaton | 707/200 |
| 5,819,263 A | * | 10/1998 | Bromley et al. | 707/3 |
| 5,835,908 A | * | 11/1998 | Bennett et al. | 707/10 |
| 5,864,852 A | * | 1/1999 | Luotonen | 707/104.1 |
| RE36,145 E | * | 3/1999 | DeAguiar et al. | 345/511 |
| 5,893,092 A | * | 4/1999 | Driscoll | 707/5 |
| 5,893,920 A | * | 4/1999 | Shaheen et al. | 711/133 |
| 5,909,510 A | * | 6/1999 | Nakayama | 382/229 |
| 5,943,669 A | * | 8/1999 | Numata | 707/5 |
| 5,983,246 A | * | 11/1999 | Takano | 707/514 |
| 6,003,034 A | * | 12/1999 | Tuli | 707/101 |
| 6,009,442 A | * | 12/1999 | Chen et al. | 707/522 |
| 6,029,175 A | * | 2/2000 | Chow et al. | 707/104 |
| 6,032,227 A | * | 2/2000 | Shaheen et al. | 707/205 |
| 6,038,560 A | * | 3/2000 | Wical | 707/5 |
| 6,038,601 A | * | 3/2000 | Lambert et al. | 709/226 |
| 6,049,797 A | * | 4/2000 | Guha et al. | 707/6 |
| 6,105,021 A | * | 8/2000 | Berstis | 707/3 |
| 6,112,201 A | * | 8/2000 | Wical | 707/5 |
| 6,134,018 A | * | 10/2000 | Dziesietnik et al. | 358/1.15 |
| 6,167,438 A | * | 12/2000 | Yates et al. | 709/216 |

FOREIGN PATENT DOCUMENTS

| | | |
|---|---|---|
| EP | 0 750 266 A1 | 12/1996 |
| WO | WO 97/04393 | 2/1997 |

OTHER PUBLICATIONS

Fail–Safe Message for "Insuficient Disk Space", IBM TBD, vol. # 37, Issue # 4A, P. 513–514, Apr. 1, 1994.*
Partial Document Access Cache, IBM TBD, 1989, V.31, ISS.No. 8, p. 96–98.*
Webwhacker 3.0, http://www.bluesquirrel.com/support/support_products.html, Mar. 1997, p. 1–15.*

(List continued on next page.)

*Primary Examiner*—Cesar B Paula
(74) *Attorney, Agent, or Firm*—Oliff & Berridge, PLC (57) ABSTRACT

A document storage management system and method that manages the storage of documents based upon the similarity of the content of the documents. Groups of documents are created based upon the similarity of the contents of the documents. Those groups are displayed to the user in a ranked list of selectable groups to permit selection of a group or document. The storage of the selected group or document is then managed by, for example, deleting, compressing, or copying. The displayed list may be ranked based upon a least recently used policy, the relevance to a predetermined topic, the size of the group, the radius of the group based upon the maximum distance of any document from the group centroid, the number of documents in the group and any other combination of parameters.

42 Claims, 5 Drawing Sheets

OTHER PUBLICATIONS

ForeFront WebWhacker 3.0 for Windows manual, www.ff-g.com, The Forefront Group, p. 1–123, 1996.*

Salton, G., *Automatic Text Processing—The Transformation, Analysis, and Retrieval of Information by Computer*, Cornell University, pp. 301–309.

Cutting, D. et al., *Scatter/Gather: A Cluster–based Approach to Browsing Large Document Collections*, pp. 1–2, 1992 ACM.

Goldberg, D. et al., *How to Program Networked Portable Computers*, Xerox Corporation.

Hearst, M. et al., *Reexamining the Cluster Hypothesis: Scatter/Gather on Retrieval Results*, In the Proceedings of ACM SIGIR '96, Aug., 1996, Zurich, pp. 1–9.

Kistler, J., *Disconnected Operation in a Distributed File System*, May 1993, School of Computer Science, Carnegie Mellon University, Chapter 1, pp. 1–12, Chapter 5, pp. 79–96.

Kupiec, J. et al., *A Trainable Document Summarizer*, Xerox Palo Alto Research Center, Palo Alto, CA, p. 1–8.

Liljeberg, M. et al., *Optimizing World–Wide Web for Weakly Connected Mobile Workstations: An Indirect Approach*, Department of Computer Science, University of Helsinki, Finland, pp. 1–8, 1995.

Maarek, Y. et al., *Automatically Organizing Bookmarks per Contents*, pp. 1–17, 5th Int'l www Conference, May 6–10, 1996.

O'Donnell, M. et al., *Variable Length On–Line Document Generation*1997, pp. 1–5, *Variable–Length Document Presentation*, 1997, pp. 1–3, *Preserving Coherence in Dynamic Document Presentation*, 1997, pp. 1–3. *Document Preparation*, 1997, pp. 1–4, *Summary*, 1997, p. 1.

Schilit, B. et al., *TeleWeb: Loosely Connected Access to the World Wide Web*, 1997, AT&T Bell Laboratories, pp. 1–16.

Tait, C. et al., *Detection and Exploitation of File Working Sets*, Computer Science Department, Columbia University, pp. 1–19.

Tait. C. et al., *Intelligent File Hoarding for Mobile Computers*, MOBICOM 95, Berkeley, CA, pp. 119–125.

\* cited by examiner

| SELECT A FILE TO DISCARD | | |
|---|---|---|
| TITLE | SIZE | ACCESS |
| Windows 95 and Windows NT Workstation Product Comparison | 2 | 12/5/96 4:37 PM |
| Windows 95 Networking FAQ | 10 | 12/5/96 4:39 PM |
| Windows 95 and NT Client Comparison | 3 | 12/5/96 4:39 PM |
| Ulysses FXPAL Global Mobile Wireless Computing Project | 1 | 12/6/96 2:02 PM |
| Welcome to emoryMOO! | 1 | 12/5/96 3:24 PM |
| Teleweb Presentation | 30 | 12/5/96 3:26 PM |

FIG.1
PRIOR ART

| SELECT A FILE TO DISCARD | | | | |
|---|---|---|---|---|
| RANK | TITLE | NUMBER | SIZE | ACCESS |
| 1 | -95 Windows Microsoft NT network workstation | 20 | 93 | 12/5/96 4:39 PM |
|  | Windows 95 and Windows NT Workststion Product Comparison |  | 2 | 12/5/96 4:37 PM |
|  | Windows 95 Networking FAQ |  | 10 | 12/5/96 4:39 PM |
|  | Windows 95 and NT Client Comparison |  | 3 | 12/5/96 4:39 PM |
|  | 17 more... |  | 78 | 12/5/96 4:34 PM |
| 2 | ⊕ mobile wireless network computing workstation system | 16 | 143 | 12/9/96 1:21 PM |
| 3 | ⊕ developer HTML web CGI Microsoft program URL | 13 | 200 | 1/9/97 6:09 PM |

DOCUMENT CACHE REPLACEMENT POLICY FOR AUTOMATICALLY GENERATING GROUPS OF DOCUMENTS BASED ON SIMILARITY OF CONTENT

BACKGROUND OF THE INVENTION

1. Field of Invention

This invention is directed to a method and a system for managing the storage of documents. More particularly, this invention is directed to a method and a system for managing documents stored in a limited capacity storage device based on the content of the stored documents.

2. Description of Related Art

Information access plays a key role across an ever expanding range of leisure and work activities. Laptop, hand-held and palm-top computers are being reinvented as "portable information appliances" with the promise of information access anytime and anywhere. However, users of these devices have become reliant on continuous, high speed, low-cost networks available to computers, and portable computers are rarely connected to such networks. One technique that makes portable computers less dependent upon networking is a cache.

A cache is generally defined as a fast access memory that stores a copy of frequently referenced information. A cache reduces the reliance of the computer on a connection to a network and can provide documents even when disconnected from a network. Cache management systems control the information that is stored in a cache.

An important part of a cache management system is the replacement policy. The replacement policy governs which items will be removed from the cache when the cache fills up, that is, there is insufficient space in the cache to store a new item. A replacement policy requires inherently difficult decisions because each decision involves predicting the future. The accuracy of those predictions can only be measured after several requests for information have been provided to the cache. The accuracy of the predictions is measured by the efficiency of the replacement policy. The efficiency of a replacement policy for a cache is determined by the ratio of hits (items found in the cache) to misses (items missing from the cache).

The efficiency of a cache management system takes on greater importance for portable information appliances. When a computer is connected over a wireless network, and a cache miss occurs, it may not only take a relatively long time to locate and download the missing document, but the miss may also result in expensive fees for the network connection usage for the download. If the cache had the requested document in local storage, there would be no need to download the document from a network and expensive access charges would be avoided. Moreover, when a system is disconnected from a network, a cache miss may stop the user from continuing work. In an attempt to solve these and other problems with cache management systems, researchers have been investigating new replacement policies that better predict requests for documents or files.

One attempt to solve these problems involves augmenting a computational replacement policy with direct user interaction. This is based on the assumption that people often know which is the most important information to keep in local storage. Two systems, TeleWeb and Mowgli, are mobile web browsers that allow users to lock documents into the local storage. TeleWeb and Mowgli are described in "TeleWeb: Loosely Connected Access to the World-Wide Web", W. N. Schilit et al., *Computer Networks and ISDN Systems*, 28 pp. 1431–1444, 1996, and "Optimizing World-Wide Web for Weakly Connected Mobile Workstations: An Indirect Approach", T. Alanko et al., *Proceedings of the 2nd International Workshop on Services in Distributed and Networked Environments (SDNE '95)*, Jun. 5–6, 1995, respectively, and are incorporated herein by reference in their entireties. In TeleWeb, the storage contents are exposed to the user in a file by file listing and users may pin or lock items, or delete items. One problem with this type of user control is that the users tend to lock more than they delete. Therefore, the local storage becomes much less effective because it becomes filled with locked, but no longer relevant, documents.

Figure 1:
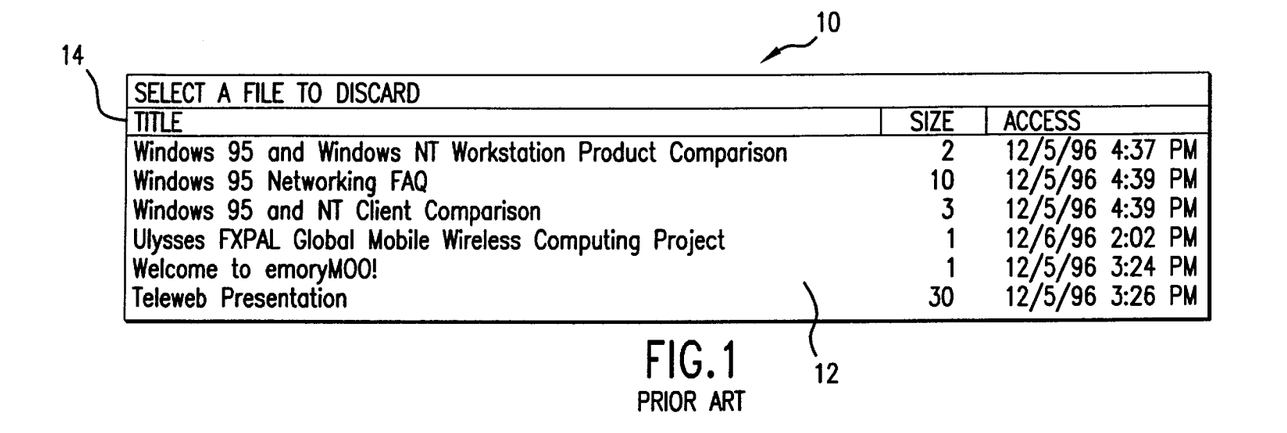
FIG. 1 is a graphical user interface of a conventional document storage management system.

Another approach taken by previous systems is to ask the user which documents are appropriate to discard and which documents are appropriate to keep. Such an approach is described in "How to Program Networked Portable Computers", D. Goldberg et al., *Proceedings of the Fourth Workshop on Workstation Operating Systems*, pp. 30–33, October 1993, incorporated herein by reference in its entirety. When replacement is necessary, the system may, for example, use a pop-up dialog box to ask for suggestions on which file to remove from storage. A pop-up dialog box is shown in FIG. 1. FIG. 1 shows a Graphical User Interface (GUI) 10 displaying a list of documents 12. The GUI 10 allows the user to select a file to discard based on the title 14. The list may be sorted for the user according to the titles 14 of the documents, the sizes of the documents or the dates of last access. The appropriate sorting is invoked when the user clicks the heading for the appropriate column. One problem with this approach is that the user is forced to explicitly select documents. A user must explicitly designate those documents that the user wishes to manage. For example, a user is forced to formulate a search query to retrieve the appropriate documents. Therefore, freeing up storage space of any significant amount requires multiple interactions. Furthermore, it is often difficult to determine a file's importance from only its file name, size or date of last access.

Some storage management systems try to predict file accesses by analyzing the history of file accesses. Two systems have been implemented that allow users to turn on recording of file accesses. The systems are described in "Detection and Exploitation of File Working Sets", C. Tait et al., *Proceedings of the 11th International Conference on Distributed Computing Systems*, May 1991, pp. 2–9, and "Disconnected Operation in a Distributed File System", James Kistler, (1993) Ph.D. Thesis, School of Computer Science on file with the Carnegie Mellon University Library, incorporated herein by reference in their entireties. Traces of file accesses are used by these systems to hoard or prefetch files into the local storage. More recently, a system described in "Intelligent File Hoarding for Mobile Computers", C. Tait et al., MOBICOM 95, pp. 119–125, ACM, Inc., incorporated herein by reference in its entirety, extended this concept to a graphic interface that permits users to select which of a number of profiles to hoard. These profiles are created by observing patterns of file accesses to both application files and data files. However, this style of storage management only works well when users have recurring and predictable patterns of file accesses.

A number of systems have used automatic techniques to present groups of related documents to a user. One technique characterizes clusters of documents with keywords and titles of representative documents in order to support browsing or full-text retrieval. This technique is described in "Scatter/

Gather: A Cluster-Based Approach to Browsing Large Document Collections", D. R. Cutting et al., *Proceedings of the 15th Annual International ACM/SIGIR Conference,* 1992, ACM, Inc., and "Reexamining the Cluster Hypothesis: Scatter/Gather on Retrieval Results", M. A. Hearst et al., *Proceedings of the 19th Annual International ACM/ SIGIR Conference,* Zurich 1996, incorporated herein by reference in their entireties.

Another system presents clusters of Web documents with keyword pairs based on their intra-cluster similarity, and allows the user to expand the contents of clusters. Such a system is described in "Automatically Organizing Bookmarks per Contents", Y. S. Maareck et al., *Computer Networks and ISDN Systems,* 28, pp. 1321–1333 1996, incorporated herein by reference in its entirety. However, these systems do not provide facilities for deleting, compressing, or taking other management actions on groups of documents.

None of the above systems works well for personal information appliances that provide access to information that cannot be neatly organized and that do not have a recurring access pattern.

A document management system is needed that augments the advantages of direct user interaction with a minimally invasive technique, does not fill up the cache with locked documents, and does not rely upon recurring access patterns.

SUMMARY OF THE INVENTION

Figure 2:
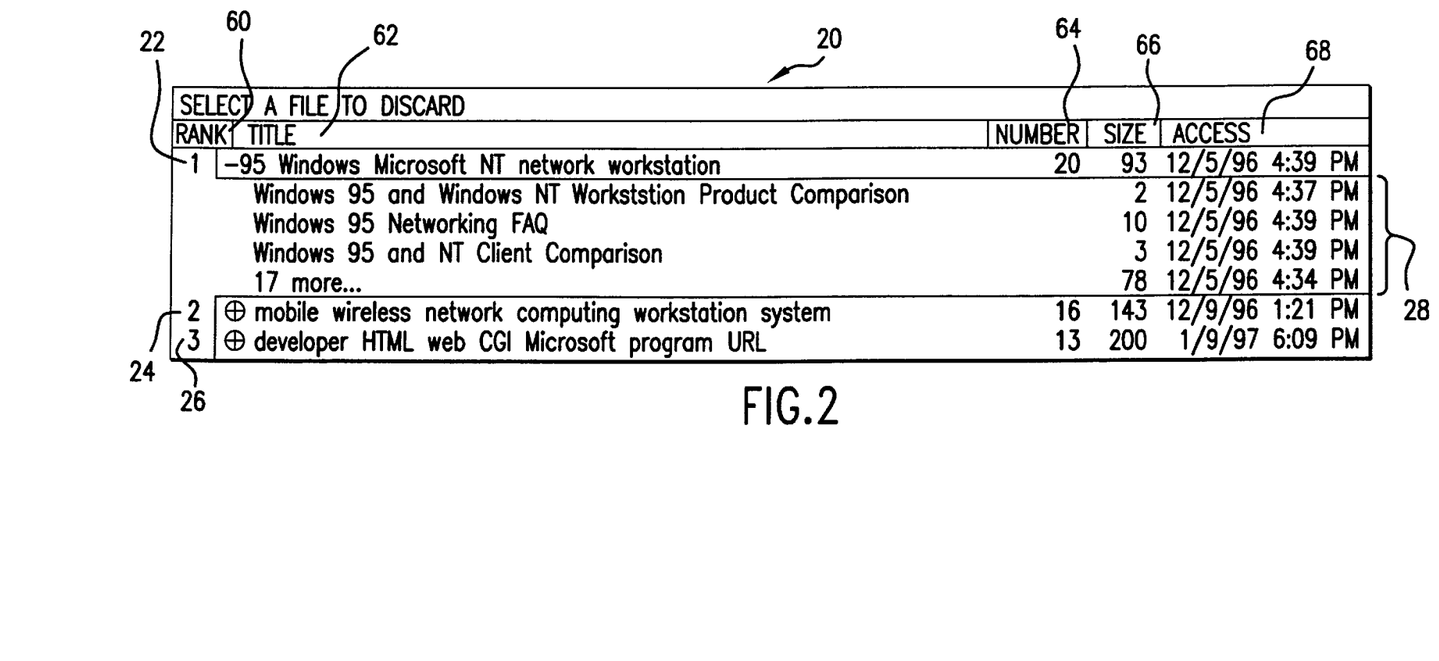
FIG. 2 is a graphical user interface showing documents grouped by the similarity of content of the documents in accordance with this invention.

This invention provides a method and a system that allow users to manage storage space by choosing among groups of documents having similar content. The content of the documents may be presented to the user in groups identified by topics. Grouping documents allows the user to free up space quickly by avoiding expensive file-by-file decisions. Grouping documents also permits the user to determine which files need to be stored locally, either for speed of access or to avoid interruptions when subsequently operating in a disconnected state, based upon the topics for which the user anticipates a future need. For example, FIG. 2 shows a GUI 20 according to one embodiment of this invention. The GUI 20 presents three groups from which the user may choose. Each group has a topic that may characterize the documents collected into that group. For example, as shown in FIG. 2, documents are collected into three groups, a first group 22 entitled "95 Windows Microsoft NT network workstation", a second group 24 entitled "mobile wireless network computing workstation system" and a third group 26 entitled "developer HTML web CGI Microsoft Program URL". Thus, the first group 22 includes documents related to networking with Windows 95 and NT, the second group 24 includes documents related to issues in mobile computing and wireless networks and the third group 26 includes documents related to developing web applications.

The user can determine which files (i.e. documents) to remove, prefetch or hoard based upon these groups of documents that have similar content. The user can quickly select a group of documents having similar, but no longer relevant content, delete that group, and free up a large amount of space by removing the entire group. The user may also anticipate which groups of documents will be used in the future and prefetch or hoard these documents from an external source into the local storage based upon the content of those documents.

The user may rely solely upon the determination of the similarity of the content of the documents within the groups or may additionally rely upon the determination of the date and time of last access, the relevance of the groups to a predetermined topic, the total size of the group, the radius of the group, and/or the number of documents in the groups. Additionally, the groups may be ranked by the date and time of last access to the documents in the group. The groups may be, alternatively, ranked in accordance with any number or combination of group characteristics.

The grouping of documents can also be used as a guideline for making document storage decisions. For example, a group may be selected out of a listing of groups and the selected group may be expanded into a list of documents from the selected group. Preferably, the document list is ranked in accordance with predetermined or user defined attributes. The user is then free to select one, several or all of the documents within the group for a storage management process.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

Figure 3:
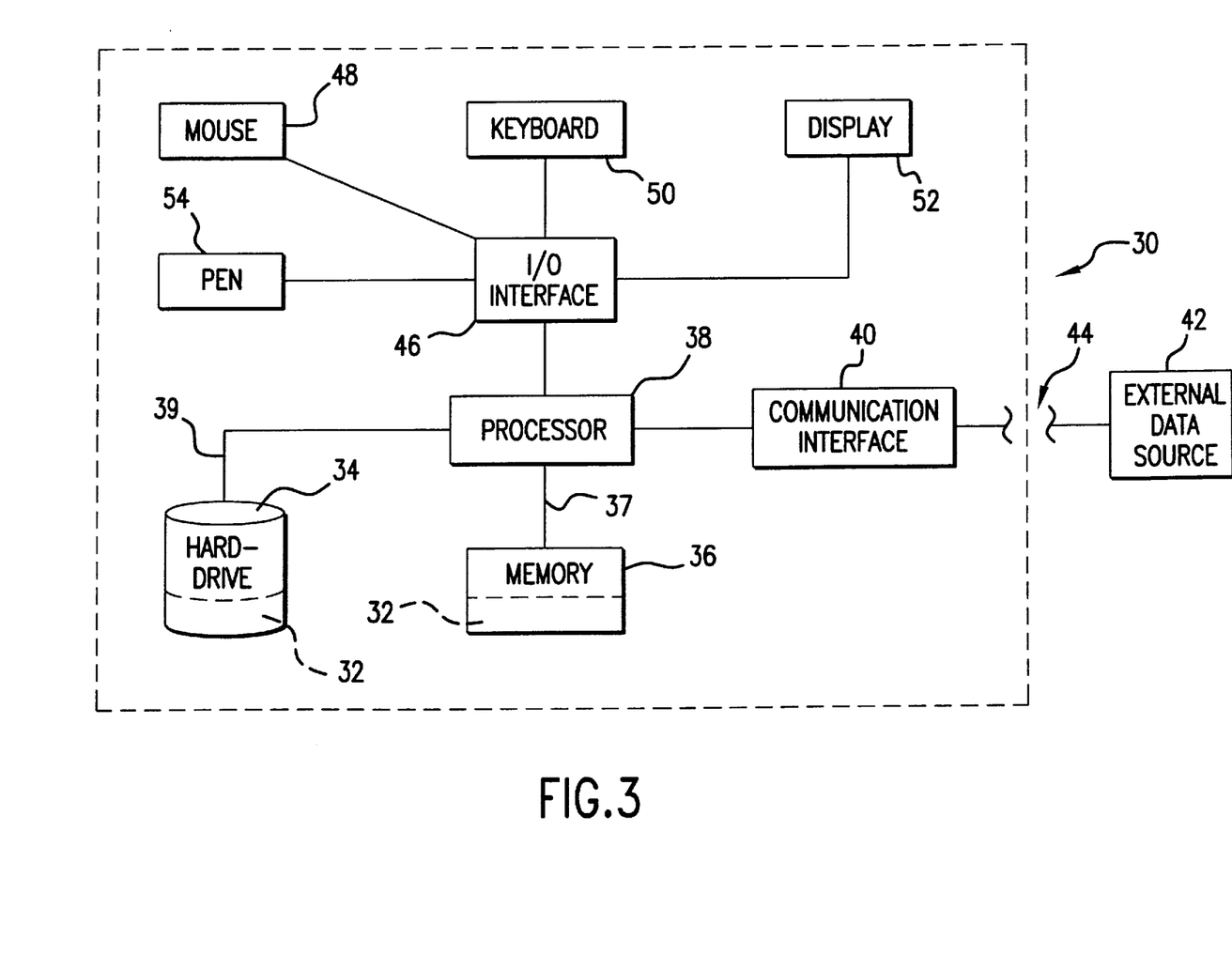
FIG. 3 is a block diagram of an information system using the document storage management system of one embodiment of this invention.

FIG. 3 shows a block diagram of an information system 30 operating with the document management system in accordance with this invention. A cache 32 may be a portion of a local storage device such as a hard drive 34 or a memory device 36. In any case, the cache 32 is a local storage buffer that stores documents that are anticipated to be accessed by the information system 30.

It should be appreciated that the document management system of this invention may extend to many types of information storage systems regardless of whether they are portable or non-portable. It should also be appreciated that although this description generally refers only to "documents", that the term "document" also encompasses any file or object that may be grouped with other files based upon the similarity of the content of those files or objects. A "file" is intended to include any unit of information. "Content" is intended to include any divisible or identifiable portion of a document such as abstracts, key words, titles or descriptions.

It is to be understood that the term "document" is intended to include text, video, audio and any other medium and any combination of media. Further, it is to be understood that the term text is intended to include text, digital ink in stroke or bitmap format, audio, images, video or any other structure or content of a document.

The information system 30 includes a processor 38 running software that embodies the document management system and which controls the document management system. A communication interface 40 allows the information system 30 to communicate with an external data source 42, such as another computer, a network, a file server, or a removable medium such as a portable hard disk or CDROM. The communication channel 44 established between the communication interface 40 and the external data source 42 may be interrupted or disconnected for a variety of reasons. The communication channel 44 may be expensive to maintain or the information system 30 may be a portable information system that is only intermittently connected to the external data source 42.

The processor 38 communicates with an input/output interface 46 that communicates with any number of conventional input/output devices, such as a mouse 48, a keyboard 50, a display 52, and/or a pen 54. While FIG. 3 only shows a display 52, it is to be understood that any type of presentation device that is appropriate for the type of document is intended.

The document management system manages the documents in the local storage device 34 by selectively removing documents from the local storage device 34 to create additional space in the local storage device 34. The document management system may also communicate through the communication channel 44 to the external data source 42 to download documents and store documents in the local storage device 34 in anticipation of future requirements.

As shown in FIG. 3, the system 30 is preferably implemented using a programmed general purpose computer. However, the system 30 can also be implemented using a special purpose computer, a programmed microprocessor or microcontroller and any necessary peripheral integrated circuit elements, an ASIC or other integrated circuit, a hardwired electronic or logic circuit such as a discrete element circuit, a programmable logic device such as a PLD, PLA, FPGA or PAL, or the like. In general, any device on which a finite state machine capable of implementing the flowchart shown in FIGS. 4 and 5 can be used to implement the system 30.

Additionally, as shown in FIG. 3, the memory 36 is preferably implemented using static or dynamic RAM. However, the local storage device 34, can also be implemented using a floppy disk and disk drive, a writable optical disk and disk drive, flash memory or the like. Additionally, it should be appreciated that the local storage device 34 can be either distinct portions of a single memory or physically distinct memories. This is also the case with the memory 36.

Furthermore, it should be appreciated that the links 44, 37 and 39 connecting the external data source 42 to the communication interface 40 and the processor 38 to the memory 36 and the hard drive 34, respectively, can be wired or wireless links to a network (not shown). The network can be a local area network, a wide area network, an intranet, the Internet or any other distributed processing and storage network. In this case, the electronic data is pulled from a physically remote external data source 42, the memory 36 or hard drive 34 through the links 44, 37 or 39 for processing in the processor 38 according to the method outlined below. Some portions of or the entire electronic document 22 can be stored locally in a portion of the memory 36, hard drive 34 or some other memory (not shown) of the system 30.

Figure 4:
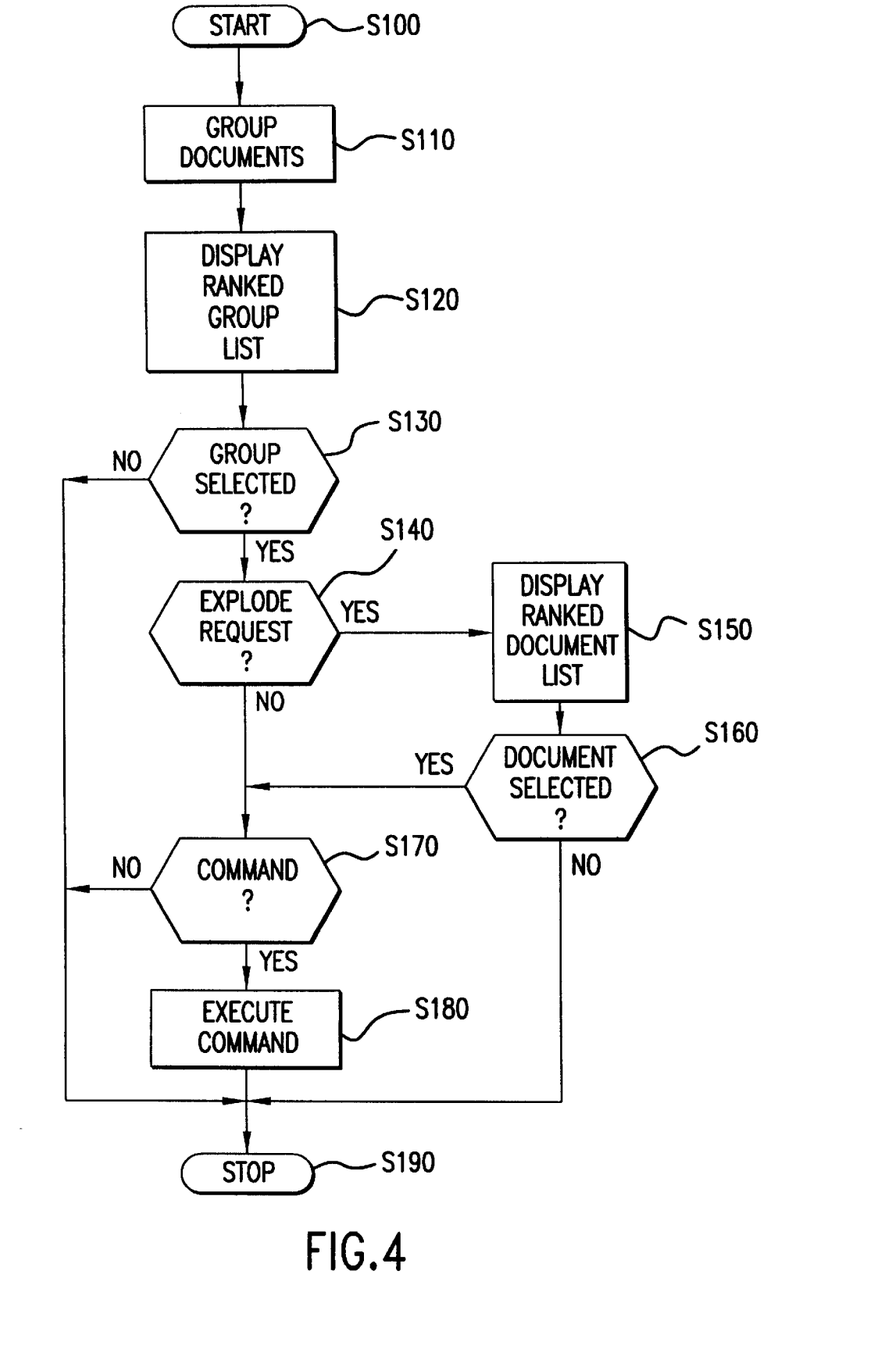
FIG. 4 is a flow chart outlining the operation of one embodiment of the document storage management system of this invention.

FIG. 4 is a flow chart of the operation of one embodiment of the control routine of the document management system of this invention. The control routine starts at step S100, and continues to step S110 where it receives a request to group the documents. The documents being grouped may be located in the cache 32 or in the external data source 42. The local documents are grouped when more storage space is needed in the cache 32 and the documents in the external data source 42 are grouped when the information system 30 is loading more documents into the cache 32. Grouping the documents relies upon procedures that are well known in the art. These procedures group documents based upon the similarity of the content of the documents. An example of such a procedure is disclosed in "Automatic Text Processing", by Gerard Sulton, pp. 303–309, Addison-Wesley Publishing Company, Inc. (1989), which is incorporated herein by reference in its entirety.

The specific method chosen for grouping the documents is not crucial, because grouping can take place in the background. Therefore, the speed of the grouping method may not be important. The only requirement is that the system groups the documents based upon the similarity of the content in the documents. It is to be understood that the term "similarity" is intended to include any measure of a document or a portion of a document's relatedness or relevance to another document or portion of a document. The similarity may be calculated, predetermined or determined by a user. The documents may be grouped by any conventional clustering algorithm. Examples of clustering algorithms include algorithms that cluster based on the size, radius of the document, the time of a document's creation, last edit or last access or any other attribute of a document. Overlapping of groups may be allowed or prohibited. A specific example of a grouping method will be described in detail below.

The control routine displays an ordered or ranked group listing at step S120. An example of a ranked group list is shown in FIG. 2. The control routine then determines, at step S130, whether a group has been selected by the user. If a group has been selected, the control routine continues to step S140. Otherwise, the control routine jumps to step S190.

In step S140, the control system determines whether the user has requested that the selected group be expanded. If the control routine determines that the user has requested that the selected group be expanded, then the control routine continues to step S150. Otherwise, the control routine jumps to step S170. In step S150, the document management system displays a ranked list of the documents within the selected group. FIG. 2 shows an expanded listing 28 of the selected group 22.

If, at step S140, the control system determines that an expand group command has been received, then the control routine proceeds to step S150. At step S150 the control routine displays a ranked list of documents within the selected group. Each document within the group is selectable by a user. If the control system determines at step S160 that a document has been selected, then the control routine proceeds to step S170.

At step S170, the system determines whether a user has input a command to operate on the selected document or group of documents. If, at step S170, the system receives a command, then the control routine continues to step S180. The command may include but is not limited to a command to delete the selected document or group of documents from the cache or to store the selected document or group of documents from the external data source into the cache. In step S180, the control routine executes the command on the selected document or group of documents. The control routine then proceeds to step S190.

Alternatively, if, at step S160, no document is selected, then the control routine continues to step S190. Similarly, if, at step S170, the control system does not receive a command, then the control routine also jumps to step S190. In step S190, the control routine stops.

In step S170, the user of the method and the system of this invention may choose from any number of storage management commands. Examples of storage management commands include deletion, compression, and copying of the selected document or group of documents.

Figure 5:
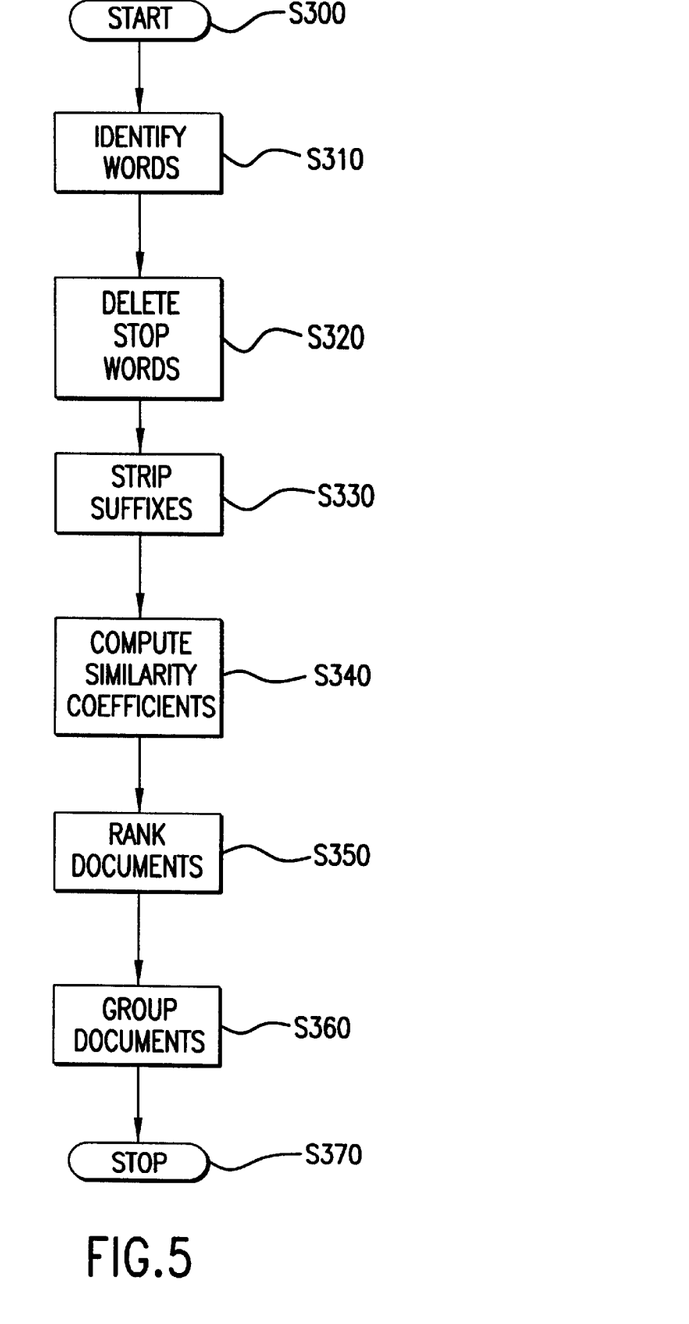
FIG. 5 is a flow chart outlining document similarity grouping routine of the invention.

One method for determining the similarity of documents comprises the method outlined in the flow chart of FIG. 5, which begins in step S300. Next, in step S310, individual words occurring in the documents of a collection are identified. Then, in step S320, a stop list of common function words ("and," "of," "or," "but," "the," and the like) are used to delete high-frequency function words that are insufficiently specific to represent the content of the documents. Next, in step S330 an automatic suffix-stripping routine is used to reduce each remaining word to word-stem form. This routine reduces all words exhibiting the same stem to a common form. Control then continues to step S340.

Next, in step S340, a typical document similarity coefficient is then obtained. A description of a document similarity coefficient calculation of a method and system of one embodiment of this invention follows. For each remaining word stem $T_j$ and document $D_i$, a weighting factor $w_{ij}$ is determined. This weighting factor $w_{ij}$ includes in part the term frequency and in part the inverse document-frequency for the term. For example, the weighting factor $W_{ij}$ is determined as:

$$w_{ij} = tf_{ij} \times \log\left(\frac{N}{df_i}\right). \quad (1)$$

Then, document vectors are calculated. A document vector for each document $D_i$ is represented by the set of word stems together with the corresponding weighting factors:

$$D_i = (T_1, w_{i1}; T_2, w_{i2}; \ldots T_t, w_{it}); \text{ or} \quad (2)$$

$$= (D_{i1}, D_{i2}, \ldots, D_{it}), \quad (3)$$

where $D_{ij}$ is a combination of the word stems $T_i$ and the inverse document frequency weight $w_{ij}$.

Finally, the similarity coefficient is calculated between documents using a conventional inner-product formula:

$$Sim(D_1, D_2) = \sum_{j=1}^{t} D_{1j} D_{2j}. \quad (4)$$

Eq. (4) can be used with variable-length vectors that exhibit a variable number of included terms. However, when non-normalized document vectors are used, longer documents with more terms have a greater chance of matching than do the shorter document vectors. This, however, does not necessarily produce the best results. The document similarity factor of Eq. (4) is advantageously normalized:

$$Sim(D_1, D_2) = \frac{\sum_{j=1}^{t} D_{1j} D_{2j}}{\sqrt{\sum_{j=1}^{t} (D_{1j})^2 \sum_{j=2}^{t} (D_{2j})^2}}. \quad (5)$$

Eq. (5) represents the cosine of the angle between the document vectors considered as vectors in a space of t dimensions, where t is the number of distinct terms in the system.

After the similarity coefficient is determined between document vectors in step S340, control continues to step S350. In step S350, documents are ranked in decreasing order of similarity. Next, in step S360, groups are formed based on a similarity metric. For example, the documents may be grouped using an algorithm that starts with each document in its own group and iteratively merges groups. A group is merged with another group only if the merger results in a group with the smallest possible radius. That is, for example, if only the first and the second groups remain as potential mergers then the first group is examined to determine the radius of a merged group that includes the first group and a second group is examined to determine the radius of a merged group that includes the second group. If the radius of the merged group that includes the first group is smaller than the merged group that includes the second group then the first group is merged. If there are more than two potential mergers then all potential mergers are examined and only the merger that results in the smallest radius is performed. This process is repeated until no additional merging is possible without exceeding a radius limit.

There are several attributes of documents or files that can be selected by the user to create good groups of candidates for removal. Groups that take up more storage space are more beneficial to remove. A group with low relevance that has been removed is less likely to incur a cache miss than a group with high relevance. A "narrow" group (one containing very similar documents) is a good candidate for removal because its narrowness minimizes the risk that users will inadvertently remove important documents because the short summary presented for a group does not resemble some outlying document that happens to be relevant. To assist the user, one embodiment of this invention uses a linear combination of the metrics of: 1) the time since the last access; 2) the relevance to the user's interests; 3) the storage space for the entire group; 4) the number of documents; and 5) the radius of the group; to determine which groups to present to the user.

The standard cache replacement policy is the Least Recently Used (LRU) policy, where a document's relevance is the inverse of the time since its last access. A document or group having a low relevance, because it has been a long time since its last access, is the best candidate for removal. The system of this invention sets the LRU time for a group of documents to be that of the most recently accessed document.

The system may optionally have an evolving query that approximates the user's interests, or some other mechanism for relevance feedback. A relevance feedback process can be used to improve query formulation while altering the original queries in two substantial ways:

1. Terms present in previously retrieved documents that have been identified as relevant to the query are added to the original query formulations; and
2. The weights of the original query terms are altered by replacing the inverse document-frequency portion of the weights with term-relevance weights obtained by using the occurrence characteristics of the terms in the previously retrieved relevant and non-relevant documents of the collection.

Assuming that the initial query is available in the form specified in a manner similar to Eq. (3), a reformulated query will take the following form:

$$Q = \alpha(w_{q1}, w_{q2}, \ldots, w_{qt}) + \beta(w'_{qt+1}, w'_{qt+2}, \ldots, w'_{qt+m}); \quad (6)$$

where

α and β may take values between 0 and 1; and the weights of the t initial terms may be generated by taking combined term-frequency and inverse-document frequency weights.

The weights of the newly added terms $t_{t+1}$ to $t_{t+m}$, on the other hand, may be determined as a combined term-frequency and a term-relevance weight.

With a relevance feedback mechanism the relevance of the document to the user's interest can be estimated. The system can then base the relevance for a group of documents on the document having the maximum relevance within the group.

The system may optionally have a user controllable device, such as a GUI interface for setting the minimum size of the groups. This allows the user to decide how much benefit they require for each interaction with the storage management interface.

The system may also permit the user to determine the minimum or maximum width of groups that are to be presented. To compute the width of a group, the system uses the radius, which is defined as the maximum distance of any element from the centroid of the group. This metric is preferred to an intra-cluster similarity (e.g., mean square distance from the centroid) because it is more sensitive to outliers, and the outliers are the documents in a group that are the least similar in content to the other documents.

The groups of documents may then be ranked in accordance with any one and/or combination of the previously described metrics or in accordance with a group score calculated from these metrics. A score for each group can be expressed as:

$$\text{Group Score} = \alpha^* \text{LRU} + \beta^* (\text{relevance}) + \gamma^* (\text{total size}) + \delta^* (\text{cluster radius}) + \epsilon^* (\# \text{ of documents}), \quad (7)$$

where α, γ, β, δ and ε are user defined constants.

When the user is examining the cache, the groups with the lowest scores are presented to the user before groups having higher scores. Alternatively, groups with the highest scores are presented first when the system is being used to select documents to download from an external data source.

The system of this invention presents the groups in a scrollable, explodable table 20, as shown in FIG. 2. For each group, the user sees the rank 60, distinguishing keywords 62, the number of documents contained within that group 64, the total size of the group (in kilobytes) 66 and a most recent time and date of access of the group 68. For groups with only one document, the list of keywords may be replaced with the document title. Initially, the table 20 is sorted by the rank 60, but the user may sort the table 20 by the size 66, the number of documents 64 or the time of last access 68. The user changes the sort variable by selecting the heading of the respective column. When a user explodes a group to a first level, the system displays the titles and attributes of the most representative documents 28. When a user explodes the group further, all the documents in the group are displayed sorted by time of access 68. Users may select entire groups or several files within a group for removal.

Figure 6:
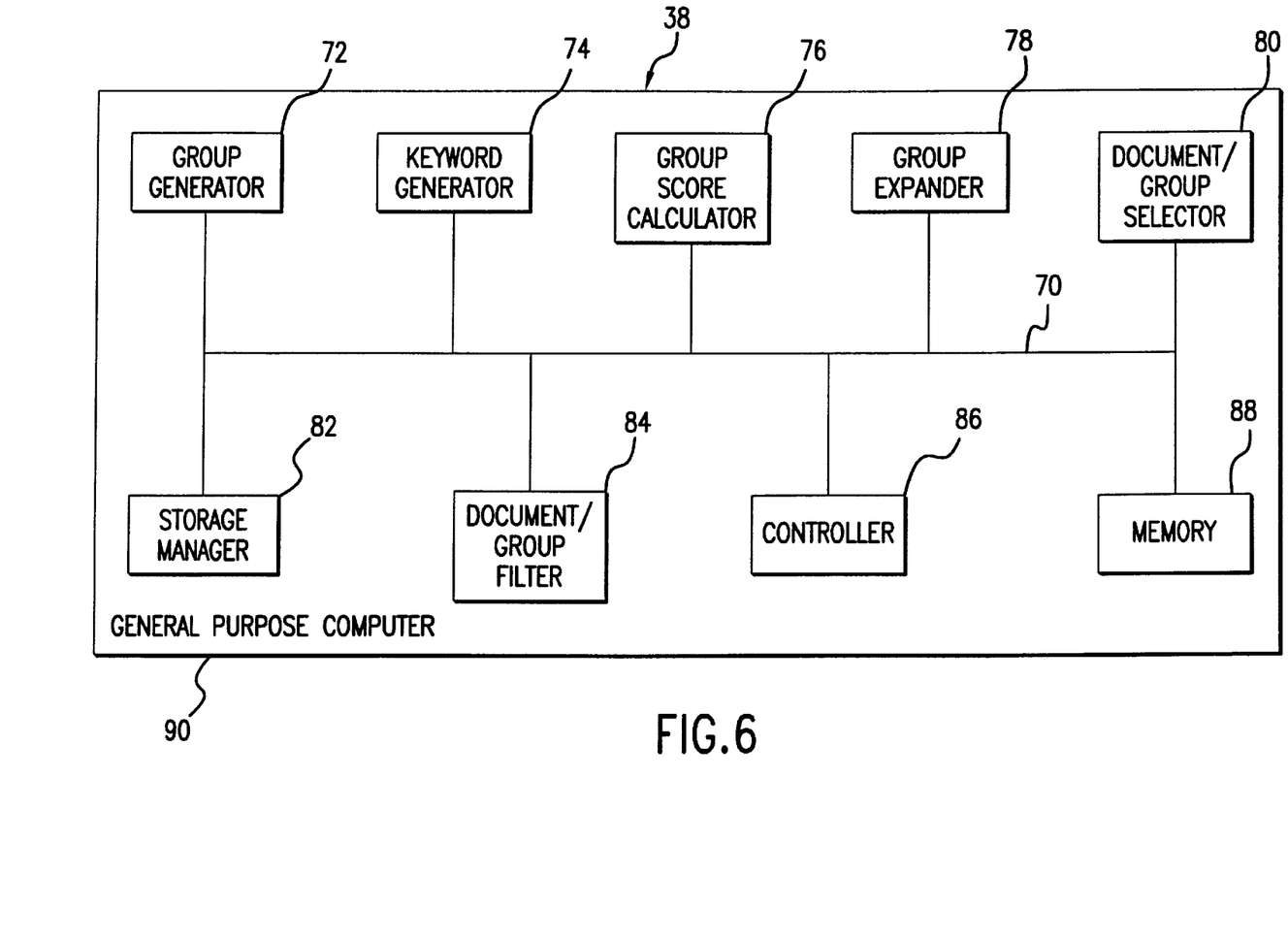
FIG. 6 is a block diagram of one embodiment of a processor of this invention.

FIG. 6 shows a block diagram of one embodiment of the processor 38 or processing system of this invention. As shown in FIG. 6, the processor 38 is implemented using a general purpose computer 90 comprising a controller 86, a memory 88, a group generator 72, a keyword generator 74, a group score calculator 76, a group expander 78, a document/group selector 80, a storage manager 82 and a group filter 84. These elements of the general purpose computer 890 are interconnected by a bus 70. The group generator 72, the keyword generator 74, the group score calculator 76, the group expander 78, the document/group selector 80, the storage manager 82 and the group filter 84, controlled by controller 86, are used to implement the flow chart of FIGS. 4 and 5. It should be appreciated that many other implementations of these elements will be apparent to those skilled in the art.

The group generator 72 implements the control routine outlined in FIG. 5. The keyword generator 74 generates keywords for each group. The keywords may then be used to indicate the content of the file to a user viewing a group listing. The keyword generator 74 may be a type of document summarizer. The group score calculator 76 generates a group score. An example method for calculating a group score has been detailed above. The group score may be used to rank the groups in a group listing. The group expander 78 expands a selected group into a list of documents contained within the selected group. As detailed earlier, a user may then select individual documents on which to perform various storage management functions. The document selection is performed using document/group selector 80. The storage manager 82 performs various storage management functions on the selected document(s) or group(s). The storage manager can perform many processes that are common to many conventional storage managers such as deleting, moving, copying, or adding a pointer to a document, flagging a document for a later process or compressing the document in the background.

While this invention has been described with the specific embodiments outlined above, many alternatives, modifications and variations are apparent to those skilled in the art. Accordingly, the preferred embodiments described above are illustrative and not limiting. Various changes may be made without departing from the spirit and scope of the invention as defined in the following claims.

What is claimed is:

1. A cache management system communicating with a document storage device, a plurality of documents stored on the document storage device, the system defining a replacement policy of a cache memory and comprising:

a group generator that automatically identifies a plurality of groups of documents from the plurality of documents in the cache memory based on a similarity of a content of the plurality of documents without a user input;

a display for displaying an ordered list of groups, each group in the list being ranked based on at least one or more of a least recently used metric of that group, a relevance metric of that group, a size of that group, a radius of that group, and a total number of documents in that group;

a selector that the user uses to select at least one of the groups of documents displayed in the ordered list; and an operation command input device that accepts an operation command input by the user that instructs a cache manager to free up space in the cache memory; wherein the cache manager manages storage of the selected at least one group of documents to free up space in the cache memory based on the selection made by the selector and the operation command by acting on the selected at least one group of documents.

2. The system of claim 1, wherein the group generator generates at least one group of documents based further on at least one attribute of each of the plurality of documents.

3. The system of claim 1, wherein the operation command instructs the cache manager to delete the selected group of documents from the cache memory.

4. The system of claim 1, wherein the operation command instructs the cache manager to compress the selected group of documents in the cache memory.

5. The system of claim 1, further comprising a presentation device that presents a list of at least one selectable group identifier that corresponds to the at least one group of documents.

6. The system of claim 1, wherein the group generator orders the plurality of groups based on at least one group characteristic.

7. The system of claim 6, wherein the group generator comprises a keyword generator that generates a set of keywords for each group and the at least one group characteristic for each group is the corresponding set of keywords.

8. The system of claim 6, wherein the group generator comprises a group score calculator that determines a group score for each group.

9. The system of claim 8, wherein the group score for each group is the sum of at least one of:
a product of a first variable and a least-recently-used metric of that group;
a product of a second variable and a relevance metric of that group;
a product of a third variable and a size of that group;
a product of a fourth variable and a radius of that group; and
a product of a fifth variable and a total number of documents in that group.

10. The system of claim 9, wherein the relevance metric for each group is based on the relevance of that group to at least one predetermined topic.

11. The system of claim 9, wherein the radius for each group is based on a maximum distance of the documents from a group centroid.

12. The system of claim 8, wherein the at least one group characteristic is the group score.

13. The system of claim 1, further comprising a group filter that identifies groups that have at least one group attribute that satisfies at least one predetermined criterion.

14. The system of claim 13, wherein said group filter removes the identified groups from the list of groups.

15. A method for managing a replacement policy in a cache memory in a document storage system, comprising:
automatically grouping a plurality of documents stored in a cache memory of a document storage device into a plurality of groups based on a similarity of a content of the plurality of documents without a user input;
displaying an ordered list of the plurality of groups, each group in the list being ranked based on at least one or more of a least recently used metric of that group, a relevance metric of that group, a size of that group, a radius of that group, and a total number of documents in that group;
selecting using user input at least one of the plurality of groups of documents in the ordered list;
accepting an operation command input by the user to free up space in the cache memory; and
managing the storage in the cache memory by acting on the selected at least one of the plurality of groups to free up space in the cache memory using the operation command.

16. The method of claim 15, wherein the plurality of documents are grouped further based upon at least one attribute of each of the plurality of documents.

17. The method of claim 15, wherein the step of managing the storage comprises deleting the selected at least one of the plurality of groups from the cache memory.

18. The method of claim 15, wherein the step of managing comprises compressing the selected at least one of the plurality of groups in the cache memory.

19. The method of claim 15, further comprising generating a plurality of group keywords for each of the plurality of groups.

20. The method of claim 15, further comprising displaying a plurality of selectable group identifiers corresponding to the plurality of groups, wherein the step of selecting comprises selecting at least one of the selectable group identifiers corresponding to the selected at least one of the plurality of groups.

21. The method of claim 15, further comprising the step of ranking the plurality of groups according to at least one group characteristic.

22. The method of claim 21, wherein the ranking step comprises determining a group score.

23. The method of claim 22, wherein determining the group score for each group comprises summing at least one of:
a product of a first variable and a least-recently-used metric of each group;
a product of a second variable and a relevance metric of each group;
a product of a third variable and a size of each group;
a product of a fourth variable and a radius of each group; and
a product of a fifth variable and a total number of documents in each group.

24. The method of claim 23, wherein the relevance metric for each group is based on a relevance of that group to at least one topic.

25. The method of claim 23, wherein the radius for each group is based on a maximum distance of the documents in that group from the group centroid.

26. The method of claim 15, further comprising generating set of group keywords for each of the plurality of groups.

27. The method of claim 15, wherein managing the storage comprises deleting the selected at least one of the documents.

28. The method of claim 17, wherein managing the storage comprises compressing the selected at least one of the documents.

29. The method of claim 17, wherein managing the storage comprises copying the selected at least one of the documents.

30. A graphical user interface for managing a storage and replacement policy of a plurality of documents in a cache memory, the interface comprising:
a display for displaying to a user an ordered list of groups of documents from a plurality of documents that have been automatically pregrouped based on a similarity of a content of the documents in the cache memory without user input;
at least one selectable group identifier visible on the display, the at least one selectable group identifier representing corresponding groups of documents in the cache memory, the at least one selectable group identifier being ranked based on at least one or more of a least recently used metric of a corresponding group, a relevance metric of the corresponding group, a size of the corresponding group, a radius of the corresponding group, and a total number of documents in the corresponding group, wherein the groups of documents comprise the plurality of documents that are automatically grouped based on the content of the plurality of documents without user input, wherein the at least one selectable group identifier is responsive to a selection of the at least one selectable group identifier by at least a predetermined user input to select a corresponding at least one group of documents; and a cache manager responsive to an operational command input by a user to perform a storage management function, defining the replacement policy of the cache memory, on the selected at least one group of documents in the cache memory to free up space of the cache memory by acting on the selected at least one group.

31. The interface of claim 30, wherein the plurality of documents are grouped further based on at least one attribute of each of the plurality of documents.

32. The interface of claim 30, wherein the operational command is a command to delete the at least one selected group of documents and the cache manager deletes the selected at least one group of documents from the cache memory.

33. The interface of claim 30, wherein the operational command is a command to compress the at least one selected group of documents and the cache manager compresses the selected at least one group of documents.

34. The interface of claim 30, wherein the at least one selectable group identifier is displayed in a list that is ordered based on at least one group characteristic.

35. The interface of claim 34, wherein the at least one selectable group identifier comprises a set of keywords for each group and the at least one group characteristic for each group is the corresponding set of keywords.

36. The interface of claim 34, wherein the at least one group characteristic is a group score.

37. The interface of claim 36, wherein the group score is the sum of at least one of:

a product of a first variable and a least-recently-used metric of that group;

a product of a second variable and a relevance metric of that group;

a product of a third variable and a size of that group;

a product of a fourth variable and a radius of that group; and a product of a fifth variable and a total number of documents in that group.

38. The interface of claim 37, wherein the relevance metric for each group is based on the relevance of that group to at least one predetermined topic.

39. The interface of claim 37, wherein the radius for each group is based on a maximum distance of the documents from a group centroid.

40. The interface of claim 30, wherein the at least one selectable group identifier represents a corresponding group of documents that each have a group attribute that satisfies at least one predetermined criterion.

41. The system of claim 1, wherein the document storage device is the cache memory.

42. The method of claim 15, wherein the document storage device is the cache memory.

* * * * *